Patented Dec. 30, 1952

2,623,865

UNITED STATES PATENT OFFICE 2,623,865

COMPOSITIONS CAPABLE OF HARDENING RAPIDLY IN THE COLD CONTAINING PHENOL-FORMALDEHYDE RESINS

Karl Dietz, Kronberg in Taunus, Germany, assignor to Farbwerke Hoechst vormals Meister Lucius & Bruning, Frankfurt-on-the-Main-Hochst, Germany No Drawing. Application October 6, 1950, Serial No. 188,876. In Germany October 25, 1949

8 Claims. (Cl. 260—33.2)

The present invention relates to compositions capable of hardening rapidly in the cold to yield chemically resistant masses, and containing phenol-formaldehyde condensation products, and to a process for making such compositions.

It has already been proposed to improve the chemical resistance of masses from compositions capable of hardening rapidly in the cold and prepared from precondensed, still liquid phenolaldehyde condensation products and additions of neutral or acid hardeners and fillers, by the addition of neutral aliphatic esters of an inorganic acid having no hardening effect on the condensation product such, for instance, as alkyl phosphates. For the same purpose, it has been proposed to add chlorinated aliphatic alcohols, for instance, dichloropropanol, or halogenated aliphatic or aromatic aldehydes or their hydrates. Aromatic esters or inorganic acids such, for instance, as arylalkyl chlorides, also improve the chemical resistance but, in contradistinction to the above mentioned substances, they have a tendency to harden the liquid aldehyde condensation products in the cold. This involves the drawback that the said esters, when mixed with the latter substances, cannot be stored for long periods.

Now, I have found that a certain group of aromatic compounds has no hardening effect on the liquid formaldehyde condensation products at ordinary temperature, so that these compounds can be stored also in admixture with the said condensation products for long periods prior to combining the mixture with the cement powder containing a hardener.

Compositions capable of hardening rapidly in the cold, which have been prepared with addition of those aromatic compounds, yield masses which have a high chemical resistance especially to cold alkali lyes, piperidine, pyridine, pyrrole and other organic bases, as well as to fatty acid esters of aliphatic alcohols. The compositions according to the present invention may, for instance, be used in connection with brick work as well as for lining and coating of vessels, conduits, pipings or the like, which get into contact with acid liquids or the aforementioned chemical agents.

According to this invention, therefore, compositions capable of hardening rapidly in the cold to yield chemically resistant masses are made by mixing a cement powder containing a hardener and a filler with a liquid mixture containing a still liquid condensation product obtained by condensing in an alkaline medium formaldehyde and at least one mononuclear monohydric phenol and also containing at least one aryloxy compound obtained by the reaction of a phenol with a chlorinated aliphatic alcohol.

Depending on the purpose for which the final masses are to be used, the quantity of the cement powder may range from about 1–3 parts by weight to every 1 part by weight of liquid used for making the paste.

The condensation products of formaldehyde with mononuclear monohydric phenols, for instance, phenol itself ($C_6H_5OH$), the isomeric cresols or xylenols, and above all commercial mixtures of cresols or of xylenols, are prepared in the usual manner in the presence of an alkaline catalyst, for instance, caustic soda solution, the proportion of formaldehyde to phenol used advantageously ranges from about 1:1 to about 1.8:1. The preferred proportions ranging from about 1.4:1 to about 1.6:1. In some cases, however, a proportion 1.2:1 may be advantageous.

The preparation of the condensation products from formaldehyde and mononuclear monohydric phenols in an alkaline medium may be carried out, for example, as follows:

55 parts by weight of phenol are introduced into 14 parts by weight of a caustic soda solution of 42 per cent strength at about 60–70° C. After cooling to about 35–40° C., 100 parts by weight of a formaldehyde solution of 30 per cent strength are run in, and the whole is maintained at that temperature for about 2–3 days. The whole is then neutralized by the addition of 34 parts by weight of crude hydrochloric acid of 20 per cent strength, while cooling with ice, the temperature not being allowed substantially to exceed about 40° C. After 3 hours, the weakly acid mixture is allowed to separate into layers, the resin layer is washed with water, while stirring and renewed separation into layers, and the mixture is adjusted to pH value of 7–8 by the addition of caustic soda solution.

Especially good results can be obtained by using the aryloxy-compound in a proportion ranging from about 15–35 per cent on the weight of the formaldehyde condensation product. Proportions outside these limits are, however, also useful.

The aryloxy-compounds are obtained by condensing at least one monohydric phenol with at least one chlorinated aliphatic alcohol in an alkaline medium. As phenols there may be used, for instance, phenol itself ($C_6H_5OH$), the isomeric cresols or xylenols, α-naphthol or β-naphthol.

As chlorinated aliphatic alcohols there come into consideration, for instance, 1,3-dichloropropanol, epichlorhydrin and tertiary dichloro-isobutyl alcohol of the formula:

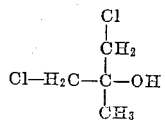

Such an aryloxy-compound is obtained, for example, by alkaline condensation of dichloropropanol with phenol according to the empirical equation:

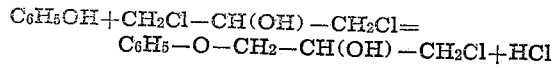

Such aryloxy-compounds are prepared, for instance, by heating for 2 hours under reflux 108 parts by weight of paracresol with 129 parts by weight of dichloropropanol or 92.5 parts by weight of epichlorhydrin and 40 parts by weight of NaOH powder, and distilling the aryloxy-compound formed under reduced pressure.

By the addition of one or more of these aryloxy-compounds to a still liquid formaldehyde condensation product of the above kind, liquids are obtained which are used for pasting with the cement powder in making the compositions capable of hardening rapidly. The masses produced with these compositions have an extraordinary chemical resistance which by far surpasses that resulting from the known addition of aliphatic esters alone.

In some cases it may be of advantage to add, besides the above mentioned aryloxy-compounds, neutral aliphatic esters of inorganic acids, which have no hardening effect and which have already been proposed for use as the sole addition. The proportions used range from about 5–25 per cent on the weight of the formaldehyde condensation product. As additions the following substances come into consideration: hydrochloric acid esters of aliphatic alcohols or halogenated aldehydes, for example, dichloropropanol, dichlorhydrin or ethylene chlorhydrin; and the corresponding phosphoric acid esters such as triethyl phosphate, trimethyl phosphate or the like.

Moreover, it may be advantageous in some cases to add also aldehydes, for instance, formaldehyde, acetaldehyde, benzaldehyde or the like, either alone or mixed with each other. These aldehydes are added to the liquid resin mixture or, in the form of powders, such as para-formaldehyde, paraldehyde or the like, to the cement powder.

In some cases these aldehydes may be added, with one and the same batch, to the cement powder as well as to the resin mixture. The quantities of the added aldehydes amount, in general, to about 5 to about 10%, calculated on the weight of the condensation product. In special cases they may also be larger or smaller.

The cement powder may contain as hardeners the agents known for this purpose, either alone or in any desired mixture such, for instance, as acid or neutral persulfates, titanium sulfate, metal dioxides having a neutral reaction to water, such as lead peroxide or manganese dioxide in solid form; or aromatic sulfochlorides such as para-toluene sulfochloride, β-naphthalene sulfochloride or aralkyl chlorides or aralkyl sulfates, naphthaene disulfonic acid, and especially 1,5-naphthalene disulfonic acid.

The cement powder also contains one or more fillers of the kind known to those skilled in this art, such, for instance, as quartz powder, barium sulfate and especially fillers of good thermal conductivity, such as natural or artificial graphite, silicon, silicon compounds such as silicon carbide, or the like.

The cement powder is prepared by simply mixing the ingredients together.

The compositions capable of hardening rapidly in the cold to yield chemically resistant masses are obtained by mixing a cement powder, containing at least one hardening agent and at least one filler, with a liquid containing at least one aryloxy-compound of a monohydric phenol and a chlorinated aliphatic alcohol, and also a still liquid condensation product obtained by condensing formaldehyde with a phenol in an alkaline medium, and if desired, containing a neutral aliphatic ester of an inorganic acid.

The following examples serve to illustrate the invention but they are not intended to limit it thereto, the parts being by weight:

*Example 1*

7 parts of finely powdered 1,5-naphthalene disulfonic acid are mixed with 93 parts of heavy spar. The cement powder thus obtained is pasted with a liquid consisting of 30 parts of a still liquid phenol-formaldehyde condensation product, pre-condensed in an alkaline medium and prepared from formaldehyde and phenol in the ratio of 1.4:1, and 10 parts of the aryloxy-compound prepared by condensing 1,3-dichloropropanol with phenol in an alkaline medium.

*Example 2*

10 parts of finely powdered para-toluene sulfochloride are mixed with 90 parts of graphite powder of the kind used for carbon electrodes. The resulting cement powder is pasted with a liquid consisting of 30 parts of a still liquid condensation product, pre-condensed in an alkaline medium, from formaldehyde and a commercial xylenol mixture in the ratio of 1.6:1, and 5 parts of the aryloxy-compound obtained by alkaline condensation of epichlorhydrin and para-cresol.

*Example 3*

6 parts of finely powdered para-toluene sulfochloride and 4 parts of 1,5-naphthalene disulfonic acid are mixed with 90 parts of heavy spar. The resulting cement powder is pasted with a liquid consisting of 30 parts of a still liquid cresol-formaldehyde condensation product, pre-condensed in an alkaline medium and prepared formaldehyde and para-cresol in the ratio of 1.2:1, and 3 parts of the aryloxy-compound obtained by condensing in an alkaline medium β-naphthol with tertiary dichlorisobutanol of the formula:

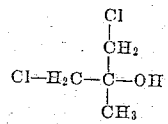

*Example 4*

5 parts of 1,5-naphthalene disulfonic acid and 2 parts of β-naphthalene sulfochloride are mixed with 93 parts of artificial graphite powder. The resulting cement powder is pasted with a liquid mixture consisting of 30 parts of a still liquid condensation product, pre-condensed in an alkaline medium and prepared from formaldehyde and a commercial xylenol mixture in the ratio of 1.5:1, 3 parts of dichloropropanol and 2 parts of the aryloxy-compound obtained by condensing 1,3- dichloropropanol with para-cresol in an alkaline medium.

Example 5

10 parts of finely powdered para-toluene sulfochloride are mixed with 90 parts of finely ground calcined electrode carbon. The cement powder so obtained is pasted with a liquid consisting of 30 parts of a still liquid condensation product, pre-condensed in an alkaline medium and prepared from formaldehyde and phenol in the molecular ratio of 1.6:1, and 10 parts of the aryloxy-compound obtained by condensing 1,3-dichloropropanol with phenol in an alkaline medium.

Example 6

5 parts of 1,5-naphthalene disulfonic acid and 2 parts of β-naphthalene sulfochloride are mixed with 93 parts of graphite powder. The cement powder so obtained is pasted with a liquid consisting of 15 parts of a still liquid condensation product, pre-condensed in an alkaline medium and prepared from formaldehyde and phenol in the molecular ratio of 1.7:1, 15 parts of a still liquid condensation product, pre-condensed in an alkaline medium and prepared from formaldehyde and a commercial xylenol mixture in the molecular ratio of 1.8:1, 5 parts of an aryloxy-compound obtained by condensing para-cresol with dichloropropanol in an alkaline medium, and 5 parts of an aryloxy-compound obtained by condensing phenol with epichlorhydrin in an alkaline medium.

Example 7

10 parts of para-toluene sulfochloride are mixed with 90 parts of heavy spar. The cement powder so obtained is pasted with a liquid consisting of 10 parts of a still liquid condensation product, precondensed in an alkaline medium and prepared from formaldehyde and phenol in the molecular ratio of 1.6:1, 20 parts of a still liquid condensation product, pre-condensed in an alkaline medium and prepared from formaldehyde and a commercial mixture of isomeric cresols in the molecular ratio of 1.4:1, 3 parts of an aryloxy-compound obtained by condensing in an alkaline medium phenol with tertiary dichlorisobutyl alcohol, and 2 parts of triethyl phosphate.

Example 8

100 parts of a still liquid condensation product produced by alkaline condensation from formaldehyde and phenol ($C_6H_5OH$) in the molecular ratio of 1.3:1 are mixed with 15 parts of the aryloxy-compound obtained by reacting epichlorhydrin with para-cresol in an alkaline medium, 5 parts of benzaldehyde and 10 parts of glycol-chlorhydrin. The mixture obtained is used for making a paste with a cement powder consisting of 90 parts of artifical graphite powder, 5 parts of para-formaldehyde and 5 parts of 1,5-naphthalene-disulfonic acid. With 100 parts of the cement powder about 80 parts of the above liquid are required.

I claim:

1. Compositions capable of hardening rapidly in the cold to yield chemically resistant masses, comprising a filling agent, a still liquid condensation product obtained by condensing, in an alkaline medium, formaldehyde and phenol, a hardening agent for said condensation product, and an aryloxy-compound distilled from a mass obtained by heating under reflux for about two hours about 108 parts by weight of para-cresol with about 92.5 parts by weight of epichlorhydrin in an alkaline medium.

2. Compositions capable of hardening rapidly in the cold to yield chemically resistant masses, comprising a filling agent, a still liquid condensation product obtained by condensing, in an alkaline medium, formaldehyde and phenol in a molecular proportion from about 1:1 to about 1.8:1, a hardening agent for said condensation product, and an aryloxy-compound distilled from a mass obtained by heating under reflux for about two hours about 108 parts by weight of para-cresol with about 92.5 parts by weight of epichlorhydrin in an alkaline medium.

3. Compositions capable of hardening rapidly in the cold to yield chemically resistant masses, comprising a filling agent, a still liquid condensation product obtained by condensing, in an alkaline medium, formaldehyde and phenol, a hardening agent for said condensation product, an aryloxy-compound distilled from a mass obtained by heating under reflux for about two hours about 108 parts by weight of para-cresol with about 92.5 parts by weight of epichlorhydrin in an alkaline medium, and a neutral aliphatic ester of an inorganic acid, which has no hardening effect upon said phenolformaldehyde condensation product.

4. Compositions capable of hardening rapidly in the cold to yield chemically resistant masses, comprising a filling agent, a still liquid condensation product obtained by condensing, in an alkaline medium, formaldehyde and phenol, a hardening agent for said condensation product, an aryloxy-compound distilled from a mass obtained by heating under reflux for about two hours about 108 parts by weight of para-cresol with about 92.5 parts by weight of epichlorhydrin in an alkaline medium, and an aldehyde.

5. Compositions capable of hardening rapidly in the cold to yield chemically resistant masses, comprising a still liquid condensation product obtained by condensing, in an alkaline medium, formaldehyde and phenol, 1.5-naphthalene disulfonic acid as a hardening agent for said condensation product, graphite powder as a filling aegnt, and an aryloxy-compound distilled from a mass obtained by heating under reflux for about two hours about 108 parts by weight of para-cresol with about 92.5 parts by weight of epichlorhydrin in an alkaline medium.

6. Compositions capable of hardening rapidly in the cold to yield chemically resistant masses, comprising a still liquid condensation product obtained by condensing, in an alkaline medium, formaldehyde and phenol, 1.5-naphthalene disulfonic acid as a hardening agent for said condensation product, heavy spar as a filling agent, and an aryloxy-compound distilled from a mass obtained by heating under reflux for about two hours about 108 parts by weight of para-cresol with about 92.5 parts by weight of epichlorhydrin in an alkaline medium.

7. Compositions capable of hardening rapidly in the cold to yield chemically resistant masses, comprising a still liquid condensation product obtained by condensing, in an alkaline medium, formaldehyde and phenol, para-toluene-sulfochloride as a hardening agent for said condensation product, graphite powder as a filling agent, and an aryloxy-compound distilled from a mass obtained by heating under reflux for about two hours about 108 parts by weight of para-cresol with about 92.5 parts by weight of epichlorhydrin in an alkaline medium.

8. A process of preparing compositions capable of hardening in the cold to yield chemically resistant masses which comprises mixing a liquid containing a still liquid condensation product obtained by condensing, in an alkaline medium, formaldehyde and phenol, and an aryloxy-compound distilled from a mass obtained by heating under reflux for about two hours about 108 parts by weight of para-cresol with about 92.5 parts by weight of epichlorhydrin in an alkaline medium, with a cement powder prepared by mixing a hardening agent for said condensation product, and a filling agent.

KARL DIETZ.

REFERENCES CITED

The following references are of record in the file of this patent:

UNITED STATES PATENTS

| Number | Name | Date |
| --- | --- | --- |
| 2,258,546 | Dietz et al. | Oct. 7, 1941 |
| 2,390,198 | Voss et al. | Dec. 4, 1945 |